United States Patent
Klotz et al.

[11] Patent Number: 6,079,459
[45] Date of Patent: *Jun. 27, 2000

[54] CONTROLLER FOR TANK-FILLING SYSTEM

[75] Inventors: Maynard F. Klotz, Naperville, Ill.; Gary K. Schueman, 180 Geneva Rd., Glen Ellyn, Ill. 60137

[73] Assignees: Welding Company of America, Northlake; Gary K. Schueman, Glynn Ellyn, both of Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/022,318

[22] Filed: Feb. 11, 1998

[51] Int. Cl.[7] .................................................. F17C 5/00
[52] U.S. Cl. .......................... 141/18; 141/83; 141/94; 141/65; 141/197
[58] Field of Search ........................ 141/2–4, 18, 21, 141/48, 63, 83, 94, 95, 192, 197

[56] References Cited

U.S. PATENT DOCUMENTS

| | | | |
|---|---|---|---|
| 2,469,434 | 5/1949 | Hansen et al. | 141/3 |
| 3,620,265 | 11/1971 | Strople | 141/63 |
| 4,153,083 | 5/1979 | Imler et al. | 141/4 |
| 4,193,515 | 3/1980 | Purdy | 222/57 |
| 4,321,939 | 3/1982 | Fenwick | 137/101.27 |
| 4,333,503 | 6/1982 | Stefiuk | 141/8 |
| 4,527,600 | 7/1985 | Fisher et al. | 141/4 |
| 4,557,300 | 12/1985 | Jernberg | 141/5 |
| 4,582,100 | 4/1986 | Poulsen | 141/4 |
| 4,611,641 | 9/1986 | Carter, Sr. | 141/4 |
| 4,637,438 | 1/1987 | Weiss | 141/6 |
| 4,846,233 | 7/1989 | Fockens | 141/94 |
| 4,856,284 | 8/1989 | Mattiola et al. | 141/65 |
| 5,018,551 | 5/1991 | Pelissier | 137/571 |
| 5,022,442 | 6/1991 | Bird | 141/100 |
| 5,038,840 | 8/1991 | Fair | 141/83 |
| 5,139,057 | 8/1992 | Benedetti | 141/18 |
| 5,143,257 | 9/1992 | Austin et al. | 222/57 |
| 5,224,526 | 7/1993 | Mette et al. | 141/285 |
| 5,269,352 | 12/1993 | Gold | 141/51 |
| 5,359,522 | 10/1994 | Ryan . | |
| 5,495,875 | 3/1996 | Benning et al. | 141/83 |
| 5,513,678 | 5/1996 | Schultz et al. | 141/4 |
| 5,519,980 | 5/1996 | Guentert et al. | 53/268 |
| 5,540,251 | 7/1996 | Mayeaux | 137/88 |

(List continued on next page.)

OTHER PUBLICATIONS

*Gas Technology Systems*, represented by D. Barry Weir & Associates, 1071 North Batavia Boulevard—Bldg A, Orange, CA.

*Primary Examiner*—J. Casimer Jacyna
*Attorney, Agent, or Firm*—Seyfarth, Shaw, Fairweather & Geraldson

[57] ABSTRACT

The tank-filling system includes a manifold for coupling to tanks to be filled, a pressure transducer coupled to the manifold and a temperature transducer coupleable to at least one of the tanks. The controller receives inputs from the pressure transducer and the temperature transducer and controls a vacuum pump, a filling pump, valves for the pumps and venting valve. A computer routine executed by the controller comprises portions to cause the venting valve to open and vent the tanks, the vacuum pump to evacuate the tanks to a selected point and the fill pumps to fill the tanks at a selected pressure. The routine also comprises a portion to provide reports on the identity of the compressed gas, the number of tanks and the volume of each tank. The routine also comprises, a portion to cause the venting valve to vent the tanks, a portion to cause a predetermined number of purging cycles to be performed, a portion to cause an alarm to provide a visual and/or audible alarm in the presence of certain conditions, a portion to cause the temperature signal to be changed by a predetermined factor, portions to select the timing of the venting, evacuating and filling, a portion to enable adjustment of the software in accordance with the configuration of the valves and pumps and portions to enable selection of different fill pressures of the tanks.

20 Claims, 14 Drawing Sheets

U.S. PATENT DOCUMENTS

| | | | |
|---|---|---|---|
| 5,597,020 | 1/1997 | Miller et al. | 141/95 |
| 5,604,681 | 2/1997 | Koeninger . | |
| 5,642,761 | 7/1997 | Holbrook | 141/104 |
| 5,649,577 | 7/1997 | Farkas | 141/198 |
| 5,657,800 | 8/1997 | Campbell | 141/98 |
| 5,673,736 | 10/1997 | Farkas | 141/198 |
| 5,687,779 | 11/1997 | Andersson et al. | 141/105 |

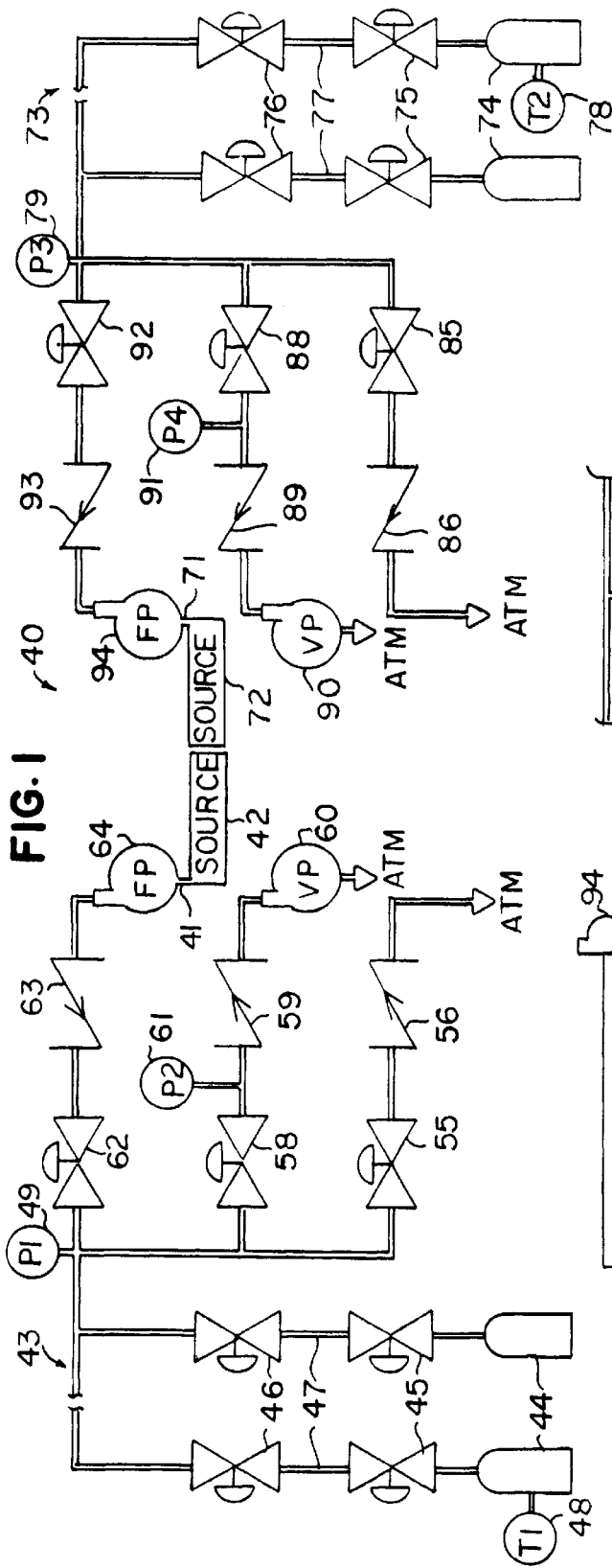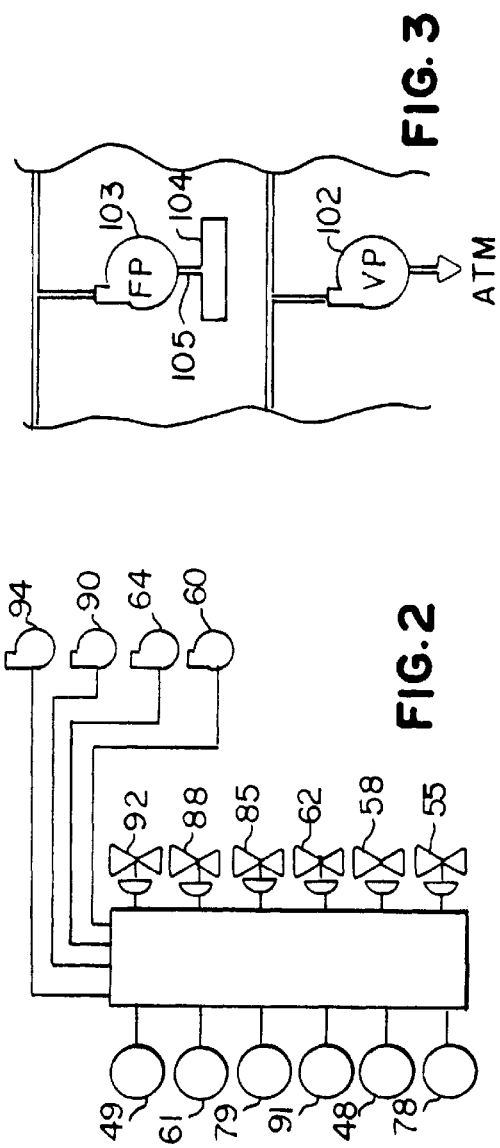

System Set Points

| | | | |
|---|---|---|---|
| 1 | 2 | 3 | 4 |
| 5 | 6 | 7 | 8 |
| 9 | 0 | Enter | |

Manifold #1

| | | |
|---|---|---|
| High Pressure Alarm | 3000 | Psig |
| High Cylinder Temp | 125 | F |
| Vacuum Set Point | 27 | Hg |
| Vent Set Point | 10 | Psig |
| Press. Transducer | 0 | 3500 Psig |
| Vac. Transducer | 30 | 0 Hg |

Manifold #2

| | | |
|---|---|---|
| High Pressure Alarm | 3000 | Psig |
| High Cylinder Temp | 125 | F |
| Vacuum Set Point | 27 | Hg |
| Vent Set Point | 10 | Psig |
| Press. Transducer | 0 | 3500 Psig |
| Vac. Transducer | 30 | 0 Hg |

Prev Screen | Main Menu

Fig-6

SystemTemperature Compensation

Manifold #1

Due to the delay and dissipation of the gas temperature to the external skin of the cylinder, compensate the thermocouple reading by 105 % to obtain the correct fill volume.

Manifold #2

Due to the delay and dissipation of the gas temperature to the external skin of the cylinder, compensate the thermocouple reading by 105 % to obtain the correct fill volume.

Prev Screen | Main Menu

Fig-7

System Timers

| Manifold #1 | | | Manifold #2 | | |
|---|---|---|---|---|---|
| Vent Valve Open Delay | 5 | Sec. | Vent Valve Open Delay | 5 | Sec. |
| Vent Close After Set Point | 10 | Sec. | Vent Close After Set Point | 10 | Sec. |
| Vacuum Valve Open Delay | 5 | Sec. | Vacuum Valve Open Delay | 5 | Sec. |
| Vacuum Set Point Hold | 3 | Sec. | Vacuum Set Point Hold | 3 | Sec. |
| Vacuum Pump Stop Delay | 3 | Sec. | Vacuum Pump Stop Delay | 3 | Sec. |
| Fill Valve Open Delay | 5 | Sec. | Fill Valve Open Delay | 5 | Sec. |
| Pump Start Delay | 5 | Sec. | Pump Start Delay | 5 | Sec. |
| Fill Valve Close Delay | 5 | Sec. | Fill Valve Close Delay | 5 | Sec. |

Prev Screen | Main Menu

Fig-8

| Manifold 1 | Nitrogen | | | | | | | | | |
|---|---|---|---|---|---|---|---|---|---|---|
| Size | 20 | 40 | 60 | 80 | 107 | 116 | 219 | 255 | 304 | Total Qty |
| Qty | | | | | | | | | | |
| Total Vol | | | | | | | | | | 0 |

| Manifold 2 | Oxygen | | | | | | | | | |
|---|---|---|---|---|---|---|---|---|---|---|
| Size | | | | | | | | | | Total Qty |
| Qty | | | | | | | | | | |
| Total Vol | | | | | | | | | | |

[ Enter ] [ Main Menu ]

Fig-15

CONTROLLER FOR TANK-FILLING SYSTEM

FIELD OF THE INVENTION

The present invention relates to a computer controller used in automatically filling cylinders or tanks with one of a number of compressed gases, such as oxygen, nitrogen or argon, and particularly to such a controller configurable to match the specifics of the customer's system and also to be able to modify the controller in the field when the customer's system and/or components are changed.

BACKGROUND OF THE INVENTION

Gases such as oxygen, nitrogen and argon have widespread use throughout industry and medicine. Manufacturing companies and hospitals commonly purchase their needs of gases from gas distributors that take liquified oxygen, nitrogen, argon, etc. from large storage tanks and deliver them as gases to smaller tanks which are usually cylindrically shaped and, therefore, are commonly referred to as "cylinders." The distributors usually own the tanks and send the tanks filled with compressed gases to their customers. When the tanks are spent, they are returned to the gas distributor who refills them with compressed gas.

For many years, the process of filling the cylinders was performed manually. The gas distributor would have a large storage tank filled with liquified oxygen, for example. Via a manifold, he would simultaneously fill ten, twenty or more tanks. As a first step, the tanks were vented, meaning that what was in the tanks was bled off. Usually a pumping system was connected to the manifold to draw a vacuum to evacuate the tanks. Often one or more purges was performed, meaning the tanks would be filled with some of the compressed gas which was then vented. Then, the tanks were again evacuated. This purging cycle could be repeated as many times as was necessary to achieve the desired purity of the tanks. Finally, the tanks were filled to the specified pressure at a stated temperature. In performing these various steps, the operator would monitor the temperature of the tanks and the pressures in the system. For example, when the tanks were vented, the operator would monitor the pressure in the tanks and when it reached a predetermined level, he would know it was time to start the evacuation process. Again, he would monitor the pressure to determine when the next step would be taken. The entire process was very time consuming and resulted in much lost time for the operator and the equipment. Also, the pumps, which were expensive, were used only a small fraction of the day.

It has been recognized that computer control of the filling process would substantially reduce the time it would take to vent, evacuate and fill tanks, and thereby increase the number of a tanks that an operator could fill during a given time period. There are computerized systems in the marketplace. They are usually made for a particular system to fill tanks with a particular gas. Such a system often incorporates one or more manifolds, a fill pump for each manifold and a vacuum pump for each manifold. With this type of system, one group of tanks is filled with one gas, such as oxygen, through one manifold, and the other manifold is used to fill the tanks connected thereto with a different gas, such as nitrogen. Another system may also include two manifolds, but a single vacuum pump and a single fill pump to enable two groups of tanks to be filled with the same gas. A gas distributor tells the manufacturer of the controller which of these configurations he plans to utilize and then the manufacturer programs the computer to match the configuration. Other information is added to the computer program by the manufacturer, such as details on the performance characteristics of the pressure and temperature transducers, the electronically controllable valves, etc.

Thus, the manufacturer of currently available controllers makes each controller to the order of its customer, each with a particular computer program.

If the gas distributor's needs change and he wants to use both manifolds for the same gas, for example, or has to purchase a different pressure transducer because the original one is no longer operable, currently available controllers would have to be reprogrammed by the manufacturer.

Gases used for medical purposes, such as those used in hospitals, are considered drugs and, therefore, are regulated by the FDA. The FDA specifies steps to be performed to achieve a certain level of purity and to check the integrity of these tanks before they are filled. Reports must comply with certain FDA regulations.

Presently available, computerized systems do not provide automatic purging, where purging is desired, for a selected number of purging cycles.

Also, these prior-art systems accommodate a single pressure when the tanks are connected to a single manifold. The tanks are pressure rated at a particular temperature (usually 70° F.) stamped on the cylinder. There are a number of common tank pressure ratings. It is not uncommon for a gas distributor to have a huge inventory of these tanks, numbering in the thousands, having a variety of pressure specifications. Presently available controllers require that only tanks having the same pressure specification be connected to the manifold so that they can all be filled to that pressure. As a result, the distributor may not have enough tanks of a certain pressure specification to be connected to all of the ports of the manifold and those ports go unused.

SUMMARY OF THE INVENTION

It is, therefore, an important object of the present invention to provide for tank-filling systems a controller which is field configurable to enable the gas distributor to easily and simply program the controller to match the configuration of his system.

Another object of the present invention is to provide a controller which is field configurable to enable the gas distributor to program the controller when he wants to change the configuration.

Another object of the present invention is to provide a controller which can be programmed in the field to be used with a tank-filling system having different components.

Another object is to enable the gas distributor automatically to track tanks by gas category, product and tank size, and also to total the number of tanks filled and their volumes.

Another object is to enable the gas distributor to obtain production reports with answers to questions about preliminary processing of the tanks, particularly for medical usage.

Another object of the present invention is to provide a controller for a tank-filling system, wherein the gas distributor can select a number of purging cycles which are automatically performed by the controller before filling.

Another object of the present invention is to provide a controller for a tank-filling system in which each manifold can be connected to tanks of different pressure specifications.

Another object of the present invention is to provide a controller which is easily retrofittable into existing plants and filling systems.

Another object is to provide a controller for a tank-filling system which incorporates a touch-screen monitor in which the operating parameters and processing are input by the operator.

Another object is to provide a controller for a tank-filling system which produces a visual and/or audible alarm in the presence of excessive tank temperature or pressure or inoperativeness of any of the transducers or pumps or in the presence of low air pressure.

Another object is to provide a controller for a tank-filling system in which the operator can program a factor into the controller to compensate automatically for differences in the exterior temperature of the tanks to be filled and the actual temperature of the gas in the tanks.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a schematic gas-flow diagram of a tank-filling system in which a controller incorporating the features of the present in on can be used;

FIG. 2 is an electrical schematic diagram of a tank-filling system incorporating the features of the present invention;

FIG. 3 depicts a variation on the system of FIG. 1, which can be controlled by a controller incorporating the features of the present invention;

FIGS. 4–15 depict various touch screens in the monitor used to control the processor of FIG. 2.

DETAILED DESCRIPTION OF THE PREFERRED EMBODIMENT

Figure 4:
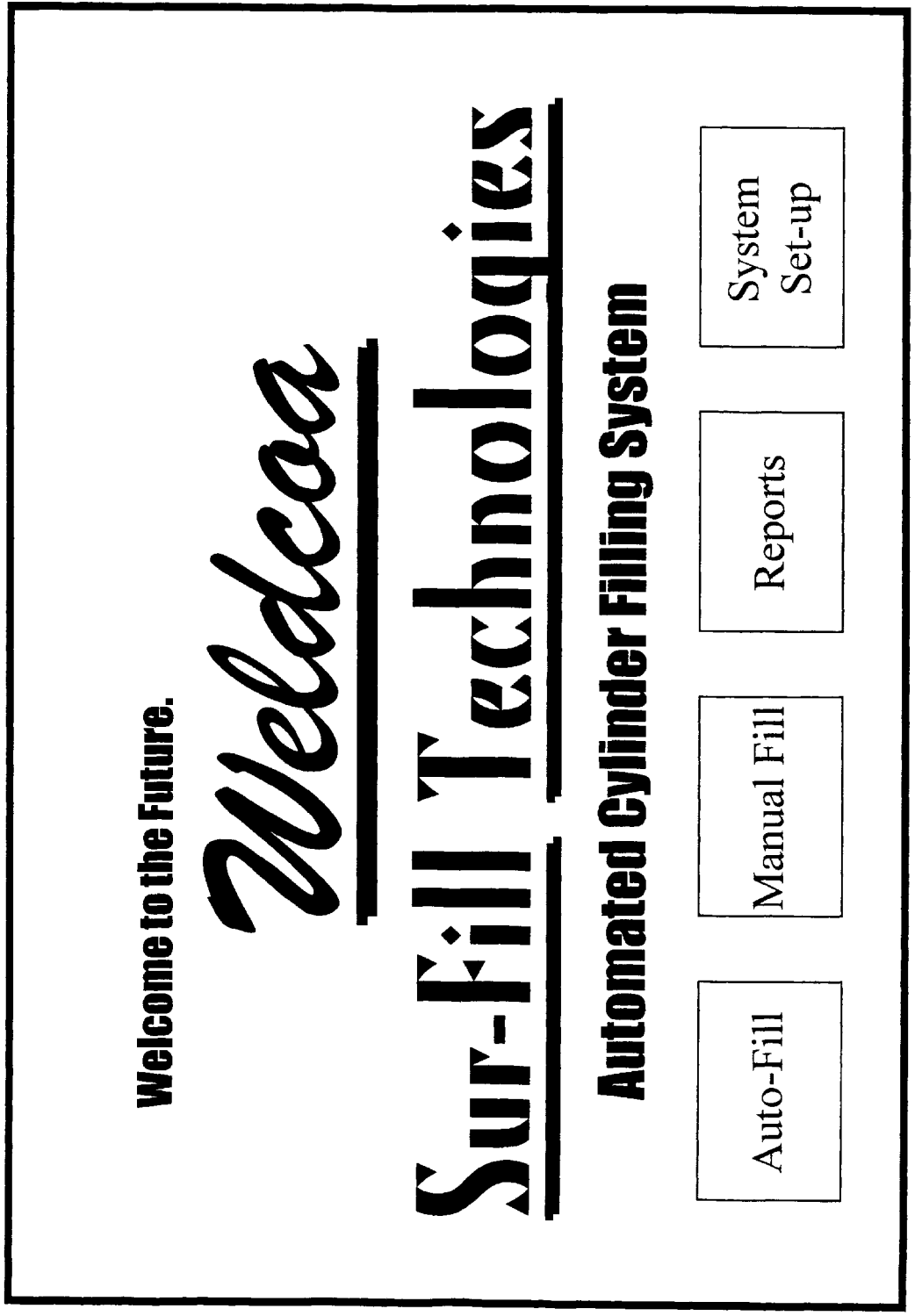

Turning now to the drawings, and more particularly to FIG. 1, there is depicted a tank-filling system 40. A conduit 41 is coupled to a source 42 of a particular gas, such as oxygen, nitrogen or argon. A manifold 43 is adapted to be connected to a plurality of tanks 44 commonly called "cylinders." Associated with each tank 44 and affixed thereon is a manually operable valve 45. Also associated with each tank during the filling operation is a second manually operated valve 46 connected by a flexible conduit 47. Valves 45 remain with their associated tanks 44 and valves 46 and conduits 47 remain with manifold 43. FIG. 1 depicts manifold 43 with two outlets and two tanks 44. In an actual system, the manifold could have 20, 30 or more outlets and an equal number of tanks to be filled.

System 40 further includes a temperature transducer 48 which may be a thermocouple and physically attached to the tank or may be coupled by infrared to a selected tank. Temperature transducer 48 provides an electrical signal representing the temperature of the tank to which it is coupled and all of the rest of the tanks 44.

System 40 further includes a pressure transducer 49 coupled to manifold 43 for providing an electrical signal representing the pressure in manifold 43.

System 40 further includes an electronically controllable vent valve 55 coupled to manifold 43 which, in turn, is coupled through a check valve 56 to atmosphere. When valve 55 is open, any gas in tanks 44 vents or bleeds to the atmosphere.

System 40 further includes a vacuum valve 58 coupled to manifold 43. A check valve 59 couples valve 58 to a vacuum pump 60. When valve 58 is open and pump 60 is turned on, gas in tanks 44 is conducted to the atmosphere. A pressure transducer 61 is coupled to the junction between valves 58 and 59, which provides an electrical signal representing the amount of vacuum in tanks 44 when vacuum pump 60 is operating and valve 58 is open.

System 40 further comprises an electronically controllable fill valve 62 coupled to manifold 43, which valve is connected by a check valve 63 to a fill pump 64 which is, in turn, coupled to gas source 42 through conduit 41. When valve 62 is open, fill pump 64 pumps gas from source 42 into tanks 44.

Preferably, valves 55, 58 and 62 are opened and closed pneumatically by a source of compressed air (not shown). Each such valve may be made by CPV Manufacturing Inc. of Philadelphia under the trademark FLOWMASTER.

In operation, valves 45 and 46 are opened and then valve 55 is opened to bleed or vent any gas in tanks 44 into the atmosphere. Then valve 55 is closed. Valve 58 is opened and vacuum pump 60 is turned on causing pressure in tanks 44 to drop and any gas therein to be pumped out. When the pressure measured by transducer 61 reaches a predetermined value, valve 58 is closed and pump 60 is turned off. Tanks 44 can be purged at this point. A purging cycle includes filling tanks 44 with the selected gas from source 42 to a selected low pressure, such as 100 psi, then venting the tanks by opening valve 55, then evacuating tanks 44 by turning on vacuum pump 60, followed by opening valve 58. The operator can select any number of such purging cycles. Then, valve 62 is opened and fill pump 64 is turned on to fill tanks 44 with gas in source 42.

System 40 includes a source 72 of another gas coupled by a conduit 71 for filling a second group of tanks 74, by means of a second manifold 73. Valves 85, 86, 88, 89, 92 and 93 correspond respectively to valves 55, 56, 58, 59, 62 and 63. Pressure transducers 79 and 91 correspond to transducers 49 and 61 respectively. A temperature transducer 78 corresponds to transducer 48. Pumps 90 and 94 respectively correspond to pumps 60 and 64.

Tanks 74 are vented by way of valve 85 and then evacuated by way of valve 88 and pump 90 and then filled by way of valve 92 and pump 94, the same way as tanks 44 are vented, evacuated and filled.

After tanks 44 and 74 are filled, valves 45 and 75 are closed. Valves 55 and 85 are opened to bleed off gas in the system. Then, tanks 44 and 74 are removed from the system and replaced by "empty" tanks to be filled.

Referring to FIG. 2, system 40 further includes a CPU or controller 100 which has electrical inputs coupled to transducers 48, 49, 61, 78, 79 and 91 and outputs coupled to valves 55, 58, 62, 85, 88 and 92 and to pumps 60, 64, 90 and 94.

A computer routine executed by controller 100 controls the valves and pumps in accordance with information from the transducers, stored information and information supplied by the operator via a touch-screen monitor, as will be presently described, automatically to vent tanks 44 and 74, to evacuate them and finally to fill them with gases from sources 42 and 72.

Referring to FIG. 3, system 40 may involve a single vacuum pump 102 and a single fill pump 103 connected to a single source of gas 104 by a conduit 105. All other components of system 40 would be included within a system incorporating the configuration of FIG. 3. With a system modified as in FIG. 3, controller 100 would turn on pump 102 to evacuate tanks 44 if valve 58 is open or tanks 74 if valve 88 is open. Tanks 44 would be filled by the gas in source 104 by operation of pump 103 if valve 62 is open and would fill tanks 74 if valve 92 is open. Controller 100 controls these valves and pumps, as will be described. The configuration of system 40 could include two fill pumps and a single vacuum pump or a single fill pump and two vacuum pumps.

Not shown is a speaker over which is produced an audible alarm to indicate an operational problem in the system or an audible tone signifying to the operator that the next step should be taken. The system also includes a visual alarm that will appear on the touch screen, as will be described.

Referring now to FIGS. 4–15, details of the touch screens of the graphic operation terminal (not shown) by which the operator programs the controller 100 and then causes it to vent, evacuate and fill tanks 44 and 74 will be described. The terminal may be one made by Mitsubishi bearing model no. A800GOT. Other devices to provide input to controller 100 can be utilized, for example, keyboards and voice-to-digital convertors.

FIG. 4 depicts the main screen with four rectangular boxes respectively bearing the legends indicated. After the system of FIGS. 1 and 2 is installed, the "System Set-Up" box is touched which brings up the screen depicted in FIG. 5, which bears eight boxes bearing the legends indicated. A drop box keypad will appear (not shown) to enable the operator to enter his pass code.

Then the "Set Points" box is touched, causing the "System Set Points" screen of FIG. 6 to appear. The screen has one box to the left labeled "Manifold #1" and a second box to the right labeled "Manifold #2." Each side has the same six lines and adjacent boxes for numbers. A keypad drop box allows entry of the six numbers on each side. When it is desired to program in a selected set point, the box next to a selected line of text is touched. Then, the number to place into that box is created by touching the numbers in the drop box. The "High Pressure Alarm" is the pressure in psig (pounds per square inch gauge) in manifold 43 above which visual and audible alarms will be set off, the valves will open and the pumps will be turned off. The operator enters the pressure which is not expected under normal operating conditions.

The "High Cylinder Temp" is the tank temperature at which visual and audible alarms will be set off, the valves will open and the pumps will be turned off. The operator enters a tank temperature which is not expected under normal operating conditions.

The box next to "Vacuum Set Point" is filled in with the goal pressure during the evacuating step, as measured by transducer 61 in inches of mercury. Obviously the greater the number inches of mercury, the less the quantity of extraneous gases in the tanks, but, on the other hand, the more time it takes, exponentially, to achieve. The box next to "Vent Set Point" is filled with the goal pressure in psig as measured by transducer 49 during the venting step, as measured by transducer 49. The less the pressure, the less the quantity of extraneous gases in the tanks, but, on the other hand, the more time it takes, exponentially, to achieve.

As will be explained, after the vent pressure reaches the selected set point, there will be a selected time during which vent valve 55 stays open to accommodate further venting. The desire is to have the pressure after the ensuing time-out period to be as close to zero as possible in order to avoid damage to vacuum pump 58 when it is then turned on.

Then the box next to "Press Transducer" is touched. Entry of the upper and lower limits, in psig, of the range of linearity indicated in the spec sheet for transducer 49 is accomplished, by touching numbers in the keypad drop box. Then the box next to "Vac. Transducer" is touched. Entry of the upper and lower limits, in inches of mercury, of the range of linearity indicated in the spec sheet for transducer 61 is accomplished, by touching numbers in the keypad drop box. Then corresponding numbers are entered into the boxes under the heading "Manifold #2" for the components associated with manifold 73.

The operator can enter settings corresponding to the particular components that he has in system 40 and, if any of those components become inoperative and need to be replaced, the operator can readily enter data corresponding to the new and/or changed components.

Temperature transducer 48, if a thermocouple, as depicted, actually measures the exterior temperature of a tank 44. Alternatively, if temperature transducer 48 measures temperature by infrared, it would also measure the exterior temperature of a tank. Measuring the temperature of the exterior of the tank is for convenience. The temperature of the gas in the tank is what is important, and is higher. Based on his experience and knowledge of the metal from which the tanks are made, together with trial and error, the operator would be able to enter a factor to improve the accuracy of the temperature measurement. For this purpose, the operator returns to the screen of FIG. 5 and touches the "Temp Comp" box, causing the screen of FIG. 7 to appear. Under the column headed "Manifold #1" is a box which the operator touches. A keypad drop box enables the operator to enter a multiplier of the measured temperature to arrive at an estimate of the temperature in each tank. The operator then follows the same procedure to enter the temperature compensation for temperature transducer 78, in the right-hand side of the screen, headed "Manifold #2".

Figure 5:
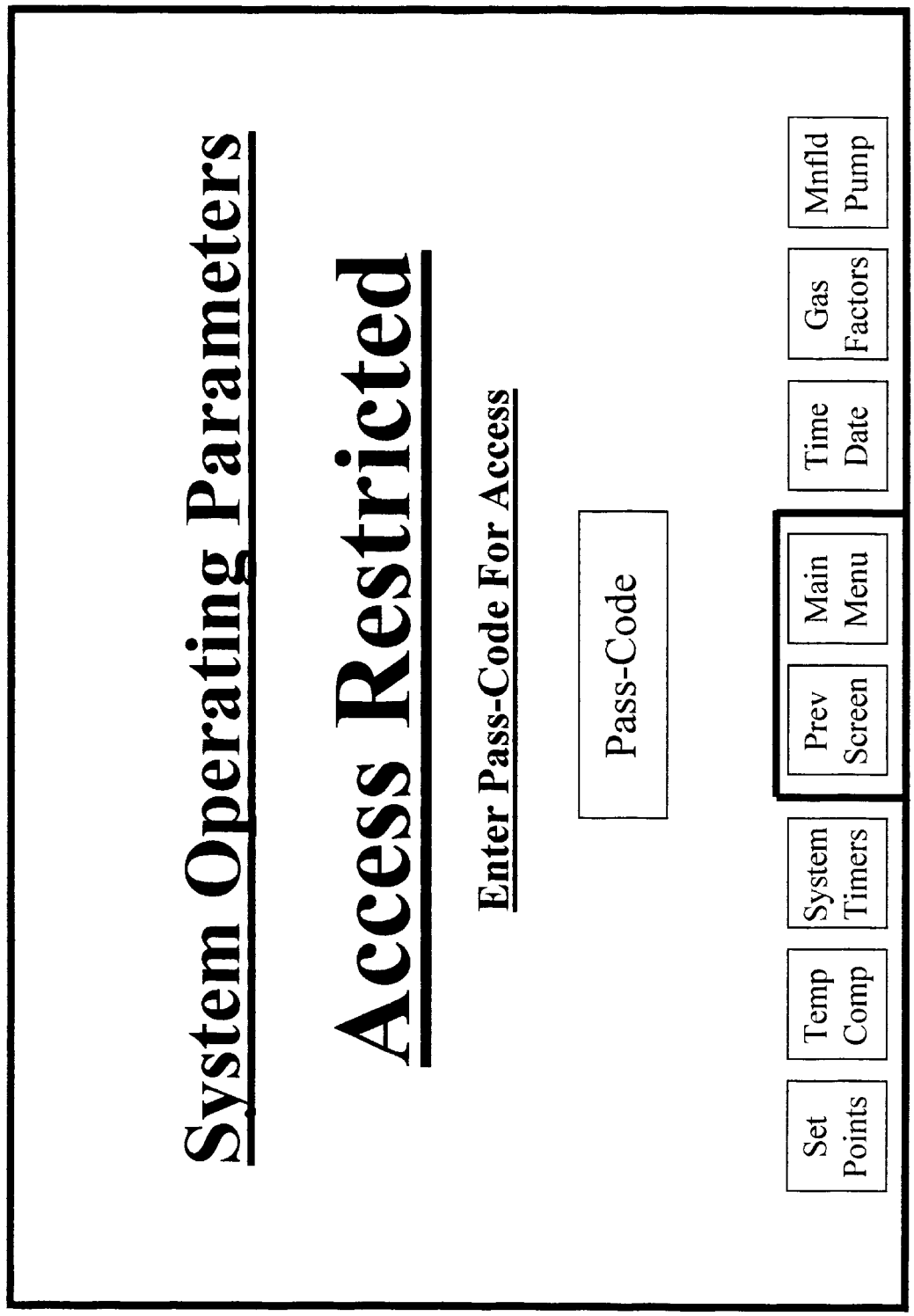

The operator then returns to the screen of FIG. 5 and touches the "System Timers" box, causing the screen of FIG. 8 to appear.

The valves and pumps associated with manifold 43 operate in the following sequence:

1. Vent valve 55 opens a first pre-set time after a start instruction.
2. Vent valve 55 closes a second pre-set time after a predetermined pressure is detected by transducer 49, which predetermined pressure was set in the block "Vent Set Point" in FIG. 6.
3. Vacuum pump 60 is turned on a third pre-set time after vent valve 55 closes.
4. Vacuum valve 58 is opened a fourth pre-set time after vacuum pump 60 turns on.
5. Vacuum valve 58 is closed a fifth pre-set time after a predetermined pressure is detected by pressure transducer 61, which predetermined pressure corresponds to the "Vacuum Set Point" entered in the screen of FIG. 6.
6. Vacuum pump 60 is turned off a sixth pre-set time after vacuum valve 58 closes.

7. Fill valve 62 is opened a seventh pre-set time after vacuum pump 60 turns off.
8. Fill pump 64 is turned on an eighth pre-set time after fill valve 62 opens.
9. Fill pump 64 is turned off in response to a predetermined pressure detected by pressure transducer 49, the selection of which predetermined pressure will be described.
10. Fill valve 62 is closed a ninth pre-set time after fill pump 64 turns off.

In an actual embodiment, one of these nine pre-set times is factory set in controller 100 and eight are field configurable by the operator. In FIG. 8, all except the third time are field adjustable. The ninth time is factory set. These eight times are entered by the operator on the screen of FIG. 8. A keypad drop box enables the operator to touch each box in succession and enter the times in seconds. As an example, the operator has entered 5, 10, 5, 3, 3, 5, 5, 5 for these eight times. Of these the most important to be field adjustable are the fourth and seventh pre-set times. Next most important to be field adjustable is the eighth pre-set time. These times are entered by the operator based on his knowledge of cycling of the valves, delays, experience and trial and error. Finally the corresponding eight times for the components associated with manifold 73 are entered in the boxes under the "Manifold #2" heading.

The operator then returns to the screen of FIG. 5, and touches the "Time Date" box to cause a screen (not shown) to appear enabling him to set the current time and date.

The operator returns to the screen of FIG. 5 and touches the "Gas Factors" box, which causes a screen (not shown) to appear on which the operator can enter gas factors that correlate pressure and temperature.

Figure 9:
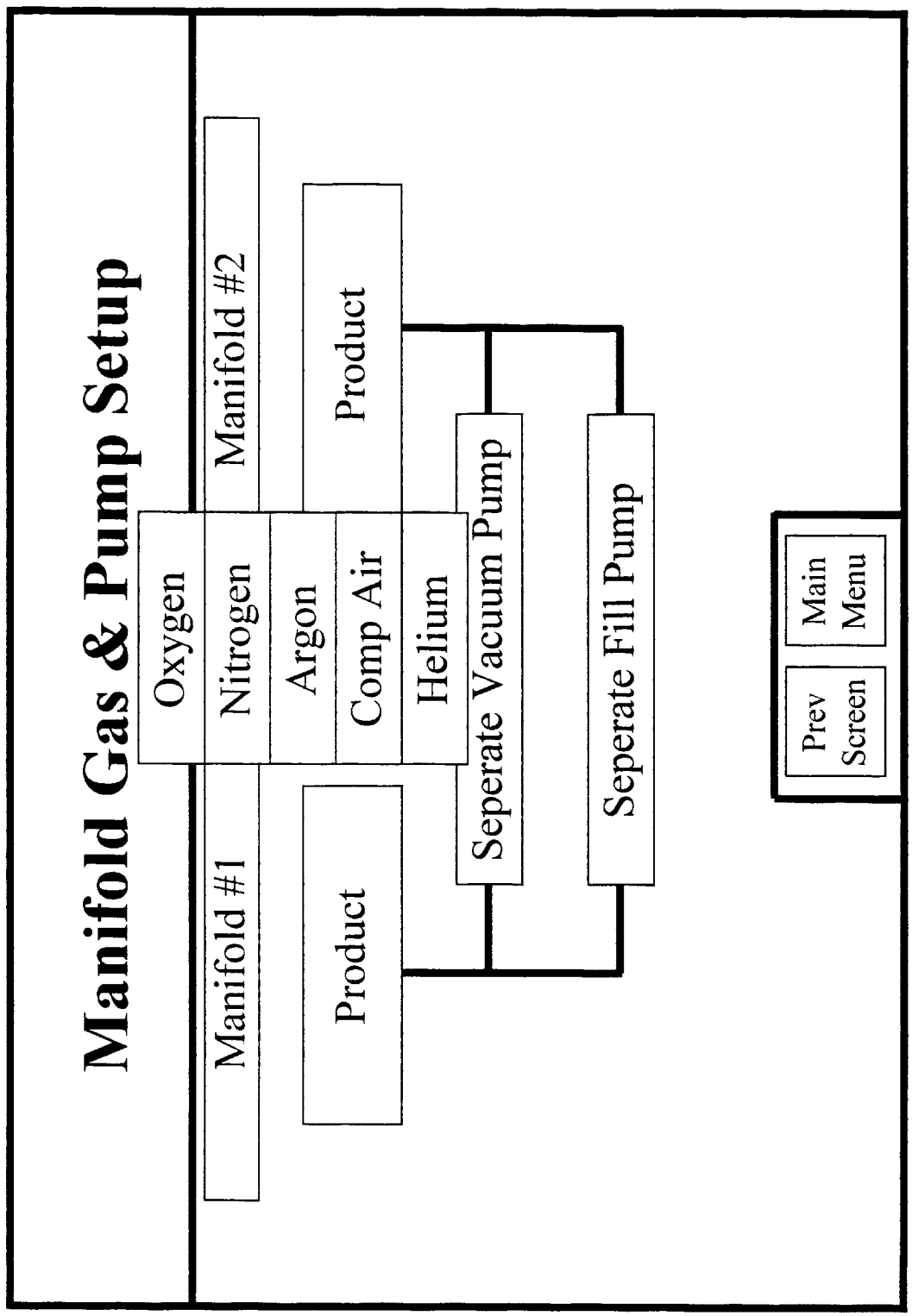

The operator returns to the screen of FIG. 5 and touches the "Mnfld Pump" box causing the screen of FIG. 9 to appear. It is this screen which enables the operator to enter information on the basic configuration of system 40.

When the "Product" box under the "Manifold #1 heading is touched, a drop box appears with sections labeled "Oxygen, " "Nitrogen," "Argon," "Comp Air" and "Helium." One section is touched whereupon the word "Product" is changed to the selected gas name. The "Product" box under the "Manifold #2" heading is touched whereupon a selection can be made as to the gas that will fill tanks 74, and the name in that box changes from "Product" to the selected gas name. If the system is as configured in FIG. 1, that is, there are separate vacuum pumps 60 and 90 and separate fill pumps 64 and 94, the boxes "Separate Vacuum Pump" and "Separate Fill Pump" are left as is. If, on the other hand, the configuration is as in FIG. 3, both boxes are touched whereupon their labels will change respectively to "Common Vacuum Pump" and "Common Fill Pump." Obviously when the same fill pump is used, then the same gas would be delivered to both groups of tanks 44 and 74. If one fill pump and two vacuum pumps are used, then the "Separate Fill Pump" box is touched, causing it to change to "Common Fill Pump." On the other hand if one vacuum pump and two fill pumps are used, then only the box labeled "Seperate Vacuum Pump" is touched causing it to change to "Common Vacuum Pump."

Figure 10:
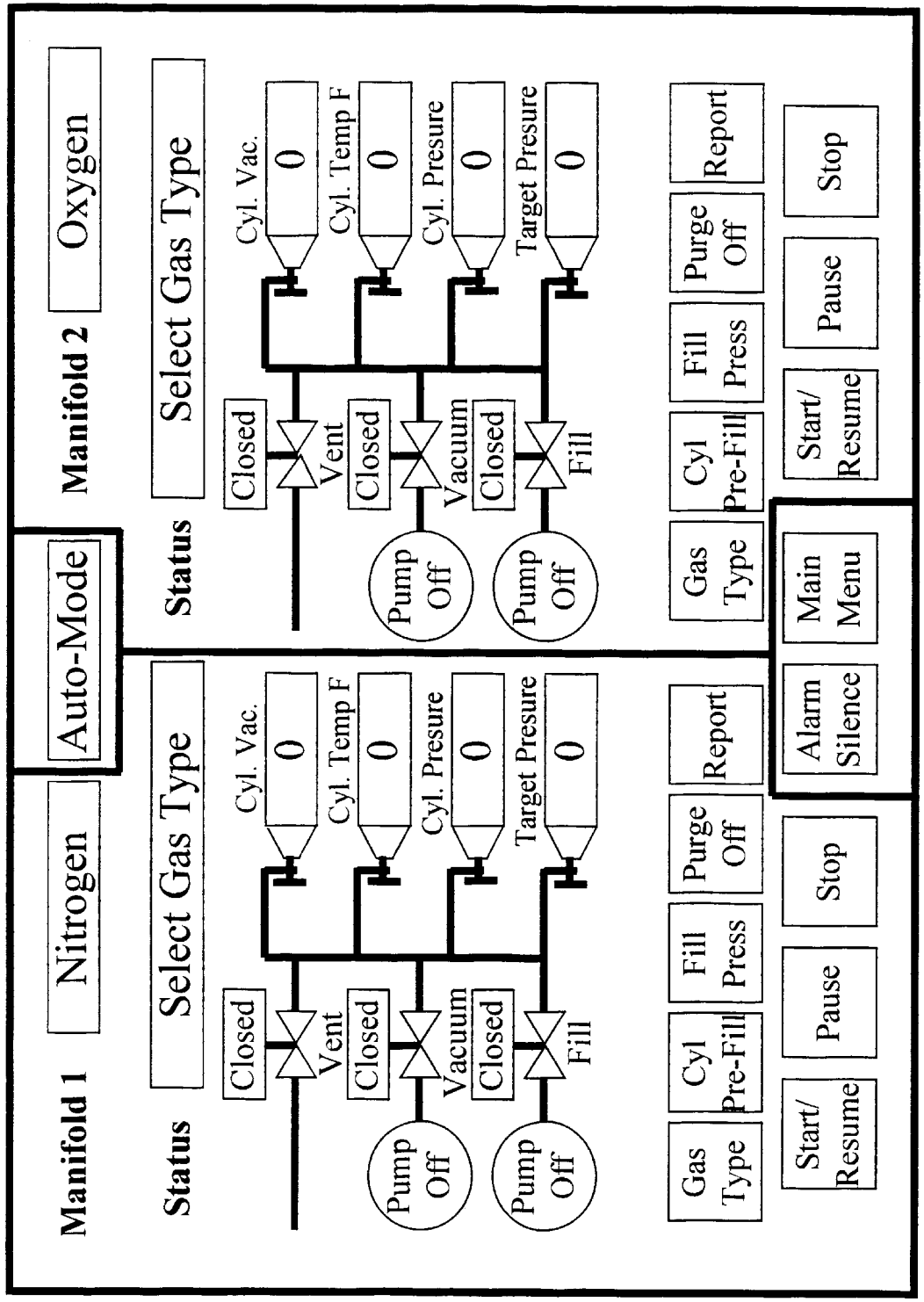
Figure 11:
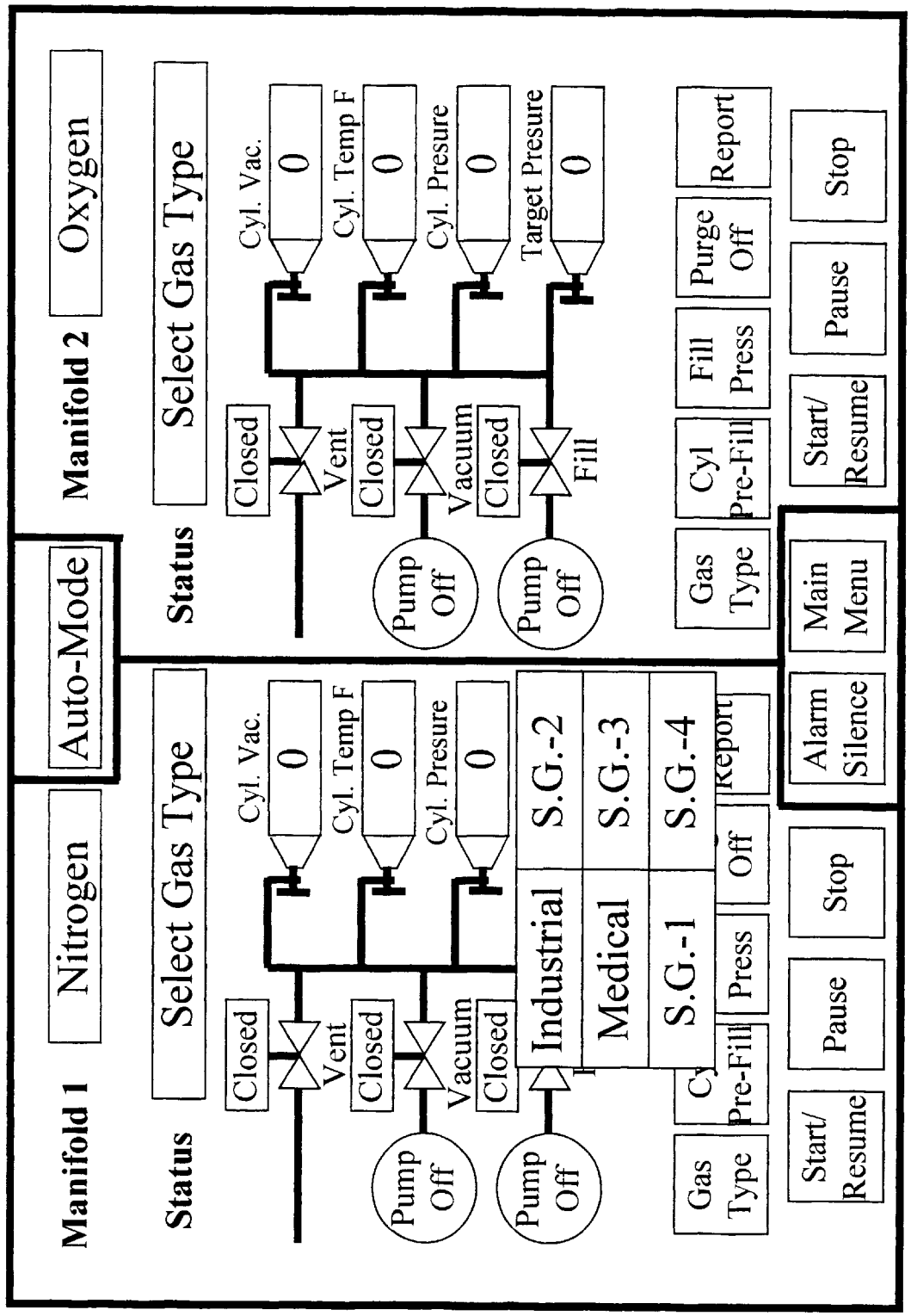
Figure 12:
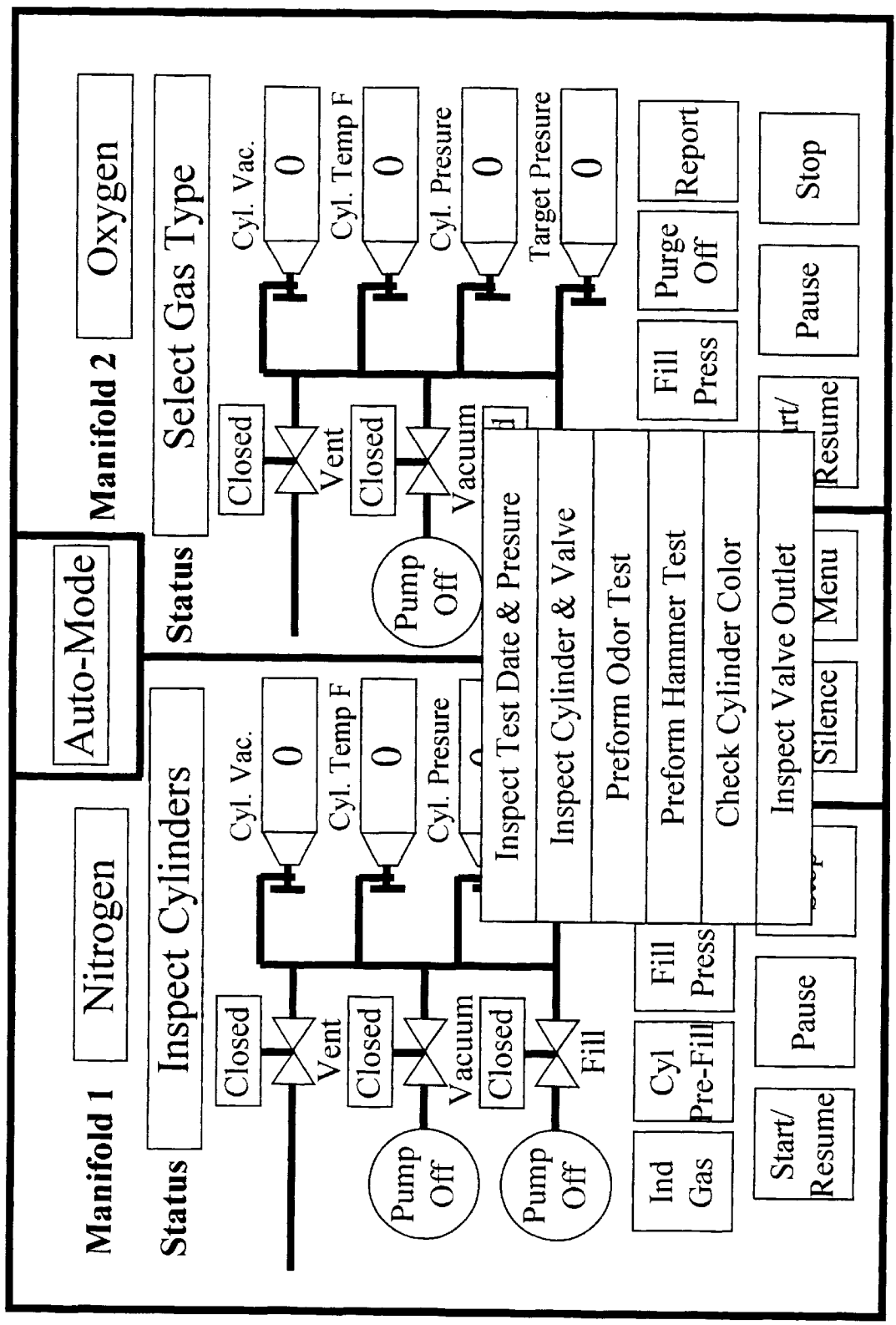

The system having been initially set up, the "Main Menu" box is touched, returned the screen to that of FIG. 4. Touching the "Auto-Fill" box causes the screen of FIG. 10 to appear. This screen schematically depicts system 40. Toward the left is a diagram corresponding to the components connected to manifold 43. The circular icons correspond to pumps 60 and 64, the X-shaped icons correspond to valves 55, 58 and 62 and the tank-shaped boxes correspond to tanks 44. Similarly, on the right side of the screen of FIG. 10 are the components connected to manifold 73 including circular icons corresponding to pumps 90 and 94, X-shaped icons corresponding to valves 85, 88 and 92 and tank-shaped boxes corresponding to tanks 74. Above each valve is a box in which the word "Open" will appear whenever the corresponding valve is open and in which the word "Closed" will appear whenever the corresponding valve is closed. In each pump icon the word "Off" will appear whenever the corresponding pump is off and the word "On" will appear whenever the corresponding pump is on. Preferably, when a pump is on or a valve is open the icons will be of one color and whenever a pump is off or a valve closed, the corresponding icon will be of a different color.

The "Status" box will initially give prompts to the operator setting up system 40 and later, when an automatic filling procedure has commenced, will provide instantaneous information on what is taking place.

In FIG. 10, it is assumed that, tanks 44 will be filled with nitrogen and tanks 74 will be filled with oxygen and thus, "Nitrogen" appears on the left of the screen and "Oxygen" appears at the right of the screen.

On the screen there are four tank-shaped boxes respectively labeled "Cyl. Vac." which displays instantaneous reading of the vacuum measured by pressure transducer 61, "Cyl. Temp. F", which displays instantaneous reading of the temperature measured by temperature transducer 48, "Cyl. Presure" which displays the instantaneous pressure measured by pressure transducer 49 and "Target Presure" which displays the pressure selected by the operator to which to fill tanks 44.

Before running the software to automatically fill the tanks, preliminary steps are performed. The prompt in the "Status" box becomes "Select Gas Type," causing the operator to touch the "Gas Type" box. The screen of FIG. 11 appears, including a drop box containing one section labeled "Industrial," a second section labeled "Medical" and four "S.G." sections 1–4. The operator touches the appropriate section depending on who is the customer, and the box changes colors.

Referring back to the screen of FIG. 10, the prompt in the "Status" box changes to "Inspect Cylinders." If the gas type selected was "Industrial" or one of the "S.G." types, the operator touches the "Cyl Pre-Fill" box after he has made the inspection, causing that box to change colors. If the operator touched the "Medical" section of the drop box, then the screen of FIG. 12 appears. Another drop box with six sections appears. The text in the instructions are based on FDA requirements. The first section of the drop box requires the operator to inspect the test date and the pressure marking on each of the tanks. After he does so, he touches that section. He would perform the rest of the instructions in sequence and touch the corresponding sections of the drop box. Most of the instructions are self explanatory. The "Hammer Test" requires the operator to strike the tank. The absence of a particular ringing sound means that it contains liquid or is rusted or its integrity has been compromised. Then, the "Cyl Pre-Fill" box would change colors and the prompt in the "Status" box changes to "Select Fill Pressure (s)" whereupon the screen of FIG. 13 appears. The drop box is divided into nine sections respectively labeled with eight standard fill pressures and one blank to receive a selected fill pressure. The operator touches the section corresponding to the pressure stamped into the tanks 44 to be filled, causing the "Fill Press" box to change color and the prompt in the "Status" box to change to "Select Purge." A drop box appears as in the screen of FIG. 14.

Tanks 44 can be purged at this point. A purging cycle includes filling tanks 44 with the selected gas from source 42, to a selected low pressure, such as 100 psi, then venting the tanks by opening valve 55, then evacuating the tanks by turning on vacuum pump 60 followed by opening valve 58. Then, valve 62 is opened and fill pump 64 is turned on to fill tanks 44 with gas in source 42 at a selected low pressure such as 100 psi. The operator can select any number of such purging cycles. The operator touches the section of the drop box to select whether he wants a purge and if so, how many purge cycles. The selected section changes colors as does the "Purge Off" box.

The "Status" prompt changes to "Enter Production." The operator touches the "Report" box and the screen of FIG. 15 appears. There are three columns corresponding to "Manifold #1" and three columns corresponding to "Manifold #2". In the "Size" column are nine common tank sizes (in cubic feet). Using a keypad drop box which would then appear, the operator enters into the "Qty" column the number of tanks of each size. For example suppose the operator wants to fill ten tanks that are each 107 cubic inches in volume and ten tanks that are each 304 cubic inches in volume. He would enter the number 10 in the "Qty" column next to 107 and "10" next to "304". The column total "Qty" would be calculated automatically meaning that the number "1070" would appear in column 3 to the right of "107" and the number "3040" would next to the number "304" and the number "4110" would appear next to the label "Total Vol". The operator would perform a similar procedure with respect to the quantity of tanks 74 to be filled with oxygen via manifold 73.

In the screen of FIG. 10, the "Report" box changes color and the prompt in the Status changes to "Press Start to Begin". To perform automatic filling of the tanks 44 with nitrogen (in the example given), the operator touches the "Start/Resume" box.

A first pre-set time after the "Start/Resume" box is touched, the vent valve opens, whereupon the word "Vent" appears in the "Status" box and the vent icon corresponding to the vent valve changes to the opened color, say, green. The Cyl Pressure drops until it reaches the predetermined pressure entered into the screen of FIG. 6. A second pre-set time after that predetermined pressure is detected, the vent valve closes and the vent icon reverts to its off color, say, red. The vacuum pump turns on a third pre-set time after vent valve closes, signified by the word "On" appearing in the vacuum pump icon and its changing to green. The word "Vacuum" appears in the "Status" box. The vacuum valve opens a fourth pre-set time after the vacuum pump turns on, signified by the icon representing the vacuum valve becoming green and the word "Open" appearing in the corresponding box.

The vacuum valve is closed a fifth pre-set time after the predetermined pressure selected in the "Vacuum Set Point" box of FIG. 6 is detected by pressure transducer 61, causing the icon representing the vacuum valve and its associated box to change to red and the word in the box above the vacuum valve icon changing to "Closed." If the pressure does not stay at that level for that fifth pre-set time, then the vacuum valve would not close.

The vacuum pump is turned off a sixth pre-set time after the vacuum valve closes, causing the vacuum pump icon to change to red. The fill valve 62 is opened a seventh pre-set time after the vacuum pump is turned off, indicated by the fill valve becoming green and the word "Open" appearing in the corresponding box. The fill pump is turned on an eighth pre-set time after the fill valve opens, signified by the word "On" appearing in the fill pump icon and that icon turning green, and the Status prompt reads "Fill". The fill pump will fill the tanks until the predetermined pressure selected when the "Fill Pres." was entered. When that pressure is reached, the fill pump is turned off signified by the word "Off" appearing in the fill pump icon and its color changing to red. The fill valve is closed a pre-set time after the fill pump turns off, signified by the word "Closed" appearing in the box above the fill valve icon and its turning red.

If at any time during the filling process, that is during venting, evacuating or filling, any of the alarm conditions occur, that is, for example, the pressure exceeds the "High Pressure Alarm" or the temperature exceeds the "High Cylinder Temp" set points entered into the screen in FIG. 6 or if the rate of change of pressure, for example, is not as previously selected, then an audible alarm will be emitted and the status box will display "Vacuum System Alarm" or "High Cyl. Temp. Alarm" or "Fill Pump Alarm" as the case may be. The valves will close, the pumps will be turned off and the type of alarm will appear in the "Status" box (e.g. "Vacuum System Alarm"). Similarly, if the tanks are being filled too rapidly, and the heat of compression exceeds the "High Cylinder Temp" set point as set in the screen of FIG. 6, the fill pump would be turned off and the status box would display "High Cyl Temp Alarm."

The pressure in a tank is only meaningful at a particular temperature. That temperature in the industry is commonly 70° F. Thus, when using the screen of FIG. 13 and a fill pressure is selected, it is assumed that the goal pressure is at 70° F. The controller 100 is programmed to take into consideration the temperature of the tanks so that the pressure in the tanks will actually be the selected pressure at 70° F. The operator touches the "Alarm Silence" box in the screen of FIG. 13 to turn off the alarm. After the problem is corrected, the operator touches the "Start/Resume" box, whereupon the program picks up where it left off.

Once the tanks are filled to the desired pressure, the manual valves 45 are closed. The "Start/Resume" box is touched to open vent valve 55 to vent pressure in the system. Then the tanks 44 are removed and replaced by "empty" tanks.

The foregoing explanation was in respect to filling tanks 44 by touching the "Start/Resume" box associated therewith. With the system depicted in FIG. 1, that is, with two sources, two vacuum pumps and two fill pumps, if the "Start/Resume" box associated with the second manifold was touched, tanks 74 would be simultaneously filled with gas corresponding to the liquid/gas in source 72. The two channels would act independently.

With the system 40 modified as in FIG. 3, so that manifolds 43 and 73 share the same vacuum pump and fill pump, both channels would be filling tanks 44 and 74 with the same gas. Controller 100 would control the valves and pumps to maximize their use. For example, when both "Start/Resume" boxes are touched, both valves 55 and 85 would open simultaneously to vent the tanks. Then, vacuum pump 102 would evacuate tanks 44. As soon as vacuum pump 102 is turned off by controller 100 because tank 44 evacuated, it would be turned on again at the appropriate time to evacuate tanks 74. Similarly, fill pump 103 would fill tanks 44 and as soon as it was done, fill pump 103 would be used to fill tank 74.

The system also accommodates printing of reports. To do so, the operator returns to the menu of FIG. 4 and touches the "Reports" box which would enable him to select reports to print. Particular reports must be submitted to the FDA for gas used in the medical field including statements that the tanks were checked, inspection tests and other tests. The responses by the operator are stored as previously explained. When it comes time to print a report, those responses are printed.

Also, instead of filling the tanks automatically, using the computer control routine described above, the operator could fill the tanks manually, in which case he returns to the menu of FIG. 4 and touches the "Manual Fill" box, whereupon a screen somewhat similar to that of FIG. 10 appears except there would be no "Target Pressure" box and others of the boxes would not appear. The operator in sequence touches the "Gas-Type" box to select the gas and make the cylinder prefill inspection. Then, the operator touches the valve icons as he wants to open and close the valves and touch the pump icons as he wants to turn on and off the pumps.

Preferably, certain of the pre-set times, such as the fourth, sixth, eighth and ninth pre-set times, described above in the automatic mode are also operational in the manual mode.

The above example assumed that all of tanks 44 were filled to the same pressure and all of tanks 74 were filled to the same albeit different pressure. Referring back to the screen of FIG. 13, assume that the operator wanted to fill ten tanks 44 to a pressure of 2265 psi and ten tanks to a pressure of 2400 psi. He would have entered the number 2265 in response to the "Select Fill Pressure" prompt. After having gone through the above-described process, all the tanks would have been filled with nitrogen at 2265 psi. He would then close valves 45 associated with those ten tanks and touch the "Start/Resume" box. 2400 had already been entered into the screen of FIG. 13. The system would continue the cycle and increase the pressure of the remaining ten tanks from 2265 to 2400.

Figure 16:
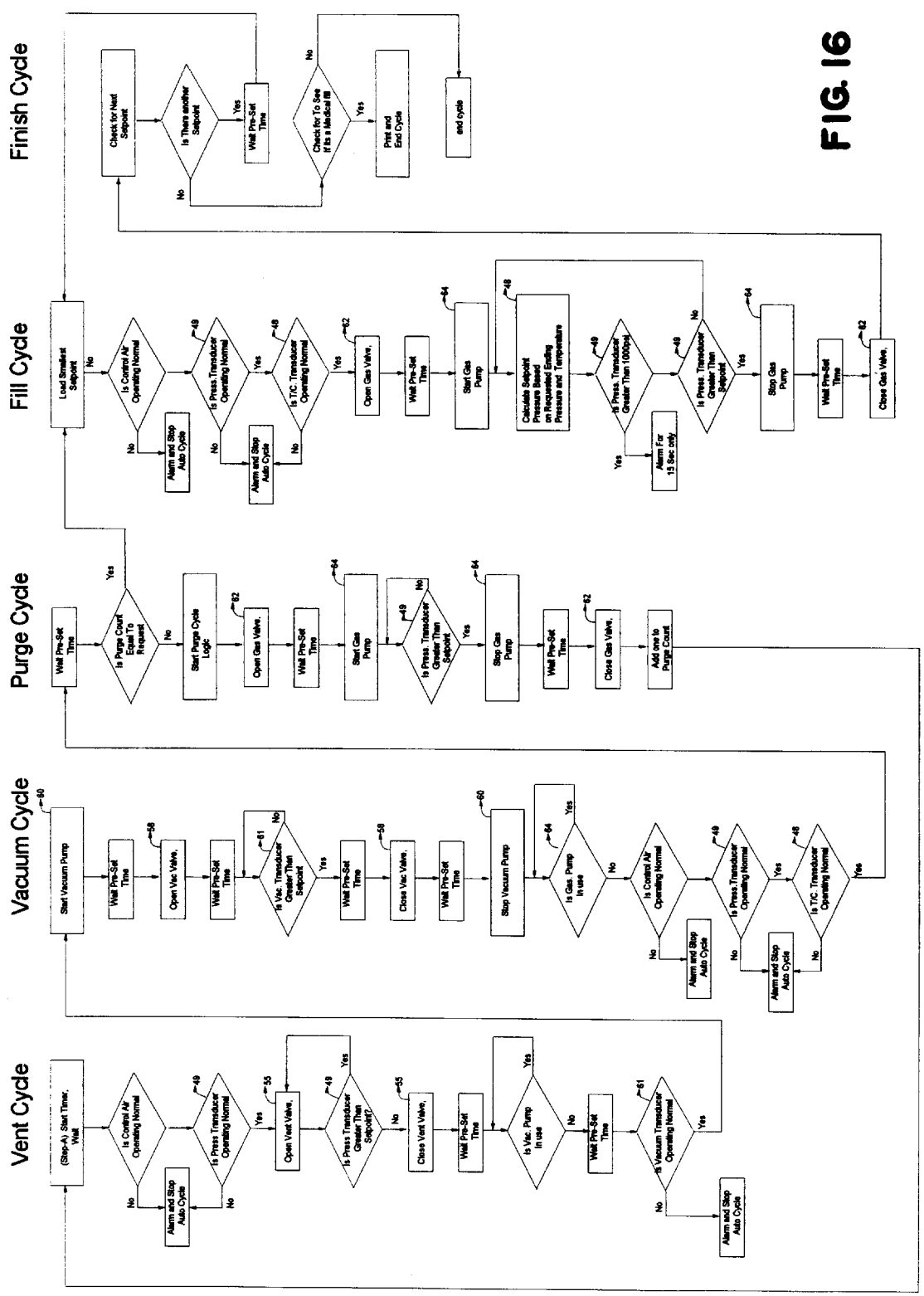
FIG. 16 depicts a flow chart for the software in the controller of FIG. 2.

Referring now to FIG. 16, the flow chart by which the software in controller 100 operates will be described. Depicted are those aspects of the software which are pertinent to the details of system 40 described above. The flow chart is divided up into five columns respectively entitled "Vent Cycle," "Vacuum Cycle," "Purge Cycle," "Fill Cycle," and "Finish Cycle." Reference numerals for certain blocks correspond to the components of system 40 of FIG. 1 associated with manifold 43. There would be a similar flow chart for the components associated with manifold 73. Thus, for example the second block is marked 55, meaning that that block deals with the opening of valve 55.

After selecting basic parameters in the screens of FIGS. 4–9 and selecting parameters corresponding to "Gas Type," "Cyl Pre-Fill," "Fill Press," "Purge Off" and "Report" on the screen of FIG. 10, the "Start/Resume" box is touched. That commences operation of the software represented by FIG. 16. The block marked "(Step-A) Start Timer, Wait" represents the first pre-set time. After vent valve 55 is open, the software evaluates the set point pressure detected by transducer 49. The software then follows the steps set forth in FIG. 16, each block corresponding to a different portion of the computer routine. These blocks generally correspond with the explanation of operation as described above, particularly with respect to FIGS. 10–15.

The second block in the Vent Cycle column inquires whether the control air is operating normally. As explained above, the valves 55, 58, 62, 85, 88 and 92 are operated by air. If the air supply is disrupted, for example, the answer is "no" and an audible and/or visual alarm is created and the cycle is discontinued. Similarly, the third block inquires whether the pressure transducer 49 is operating normally. If the answer is "no", an alarm is produced and further processing is discontinued. There are other similar situations in the software where an alarm and termination are indicated. These correspond to the more important situations where an alarm is required. However, there are numerous other situations in which an alarm is or may be produced.

In the Vent Cycle column note the diamond block inquiring about whether the vacuum pump is in use. This deals with the ability of the system to have a single vacuum pump used in association with both manifolds. If it is not in use, then evacuating can proceed even though processing of the gas associated with the other manifold is continuing.

In the Vacuum Cycle column note the diamond block inquiring about whether the gas pump is in use. This deals with the ability of the system to have a single gas pump used in association with both manifolds. If it is not in use, then filling can proceed even though processing of the gas associated with the other manifold is continuing.

Figure 14:
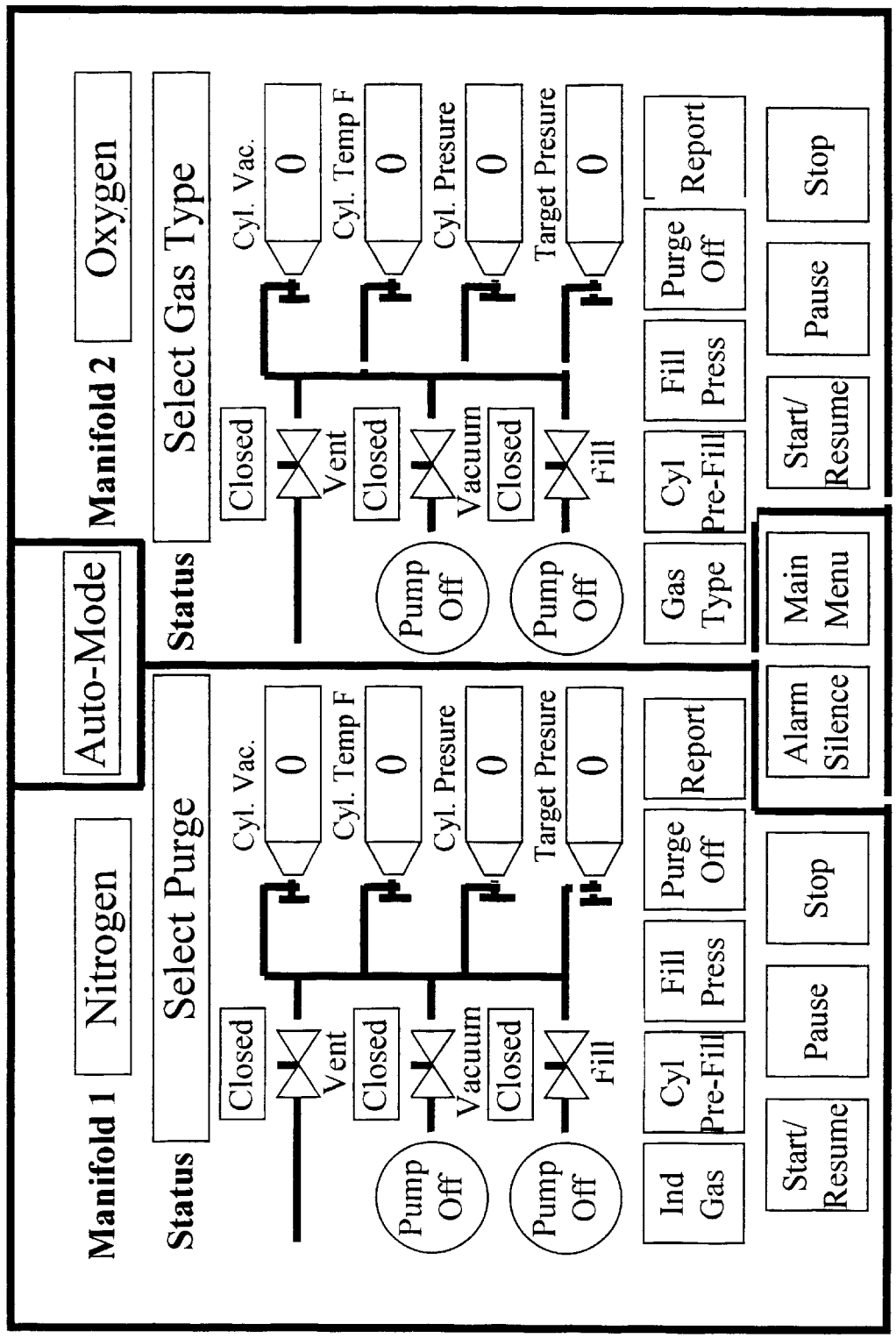

The second block in the Purge Cycle column inquires whether or not the purge count is equal to the number of purge cycles entered in the screen of FIG. 14. If the number entered was zero, then the answer would be "yes" and system 40 would commence the fill cycle. If one or more purge cycles was entered into the screen of FIG. 11, the system would go through a purge cycle. Regarding the diamond block in the Purge Cycle column inquiring whether the press transducer is greater than setpoint, such set point is 100 psi in the example of FIG. 14. After completing one purge cycle, the software instructs that "1" be added to the purge count (last block in Purge Cycle column), thereby commencing a second vent cycle.

Figure 13:
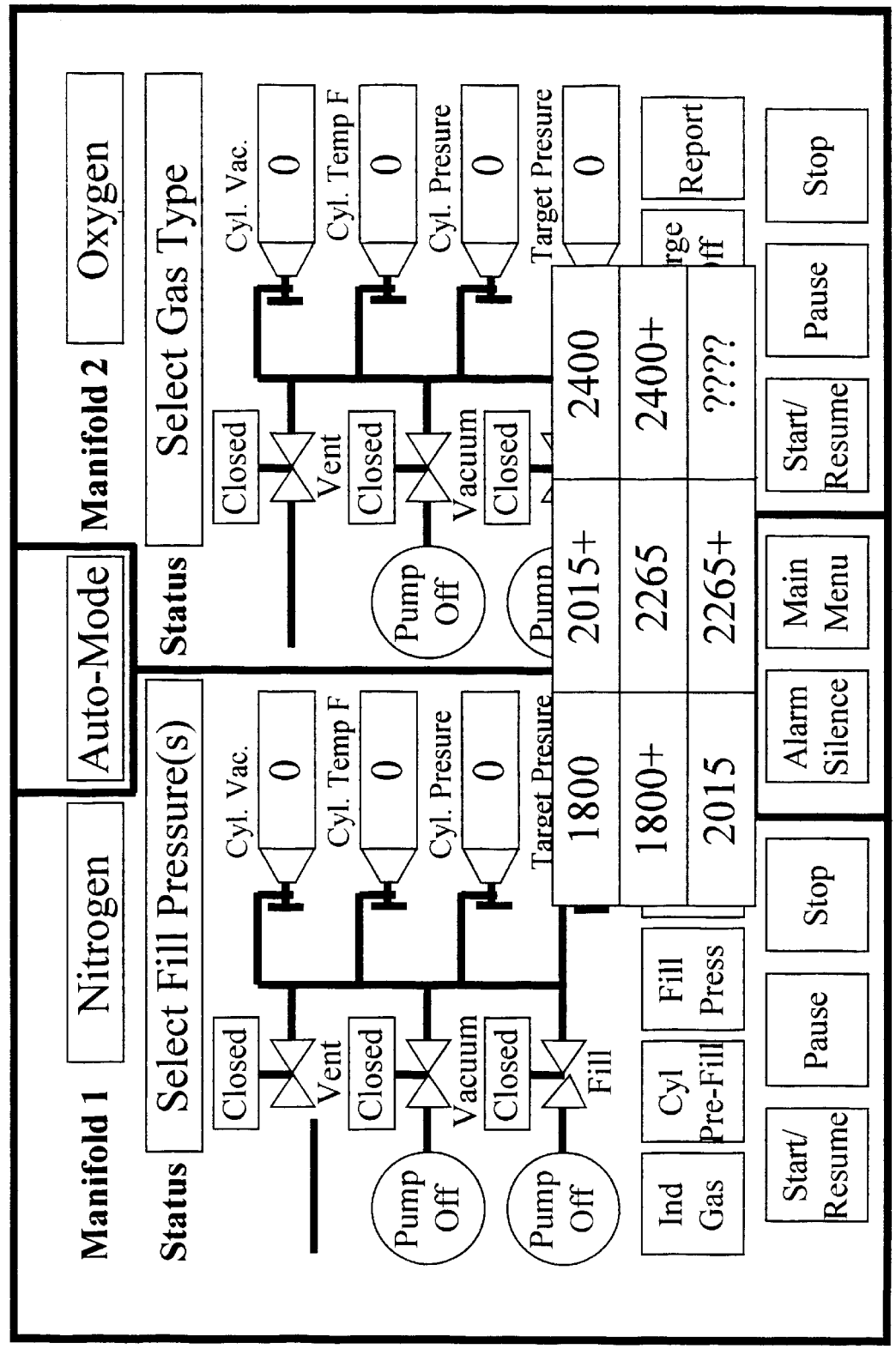

The first block in the Fill Cycle column is pertinent to selection, of more than one fill pressure in the screen of FIG. 13. The lowest one is processed to fill all the cylinders to that pressure, as described above. The calculate setpoint block in the Fill Cycle column corresponds to the portion of the computer routine which continuously calculates the instantaneous pressure based on the fill pressure entered into the screen of FIG. 13.

In the Finish Cycle column the first block indicates a check for another higher pressure entered into the screen in FIG. 13. If so, the routine reverts to the Fill Cycle column in order to fill all of the remaining tanks to the next higher pressure.

It is believed that the rest of the routine depicted in FIG. 16 is self-explanatory and no further explanation is required.

What has been described, therefore, is an improved controller for a tank-filling system. The controller is easily programmable by the gas distributor who owns system 40. He can configure the controller to match the configuration of his system. Pumps are expensive. Initially, therefore, he could purchase a single vacuum pump and a single fill pump. The controller 100 would be programmed accordingly. Later, as his business improves, he can purchase an additional vacuum pump 90 and/or fill pump 94, whereupon he can install the additional pumps and then modify controller very simply. He does not have to shut down the system for any appreciable length of time to return the software to the manufacturer for modification.

A single program is available for all customers of controller 100. The manufacturer does not have to make each controller to order.

If a component such as one of the transducers has to be repaired or replaced, the specifications of the new transducer can be readily programmed into controller 100, again with a minimum of lost time and without having to return the software to the manufacturer. System 40 enables reports to be printed with all the details about tanks filled, their content, etc. In the case of tanks filled with gas for medical purposes, the reports will comply with FDA regulations by providing confirmation of prefilling activities by the operator.

The system enables the distributor to fill tanks at the same manifold to different pressure specifications. In other words, several tanks of different pressure specifications can be connected and the system operated to fill all to the lowest of the pressures, disconnecting those to which the fill pressure matches the specification pressure and filling the rest to the high pressure, and so forth.

The system provides a visual alarm and an audible alarm when certain temperatures and pressures are exceeded and when components such as pumps and transducers are inoperative. Controller 100 automatically compensates for differences in the exterior temperature of the tanks measured by transducers 48 and 78 and the actual temperature of the gas in the tanks.

It is therefore intended that the foregoing detailed description be regarded as illustrative rather than limiting, and that it be understood that it is the following claims, including all equivalents, which are intended to define the scope of this invention.

What is claimed is:

1. A controller for use with a tank-filling system having a selected one of a number of configurations, the system including at least one conduit for coupling respectively to at least one source of compressed gas, at least one manifold for coupling respectively to at least one group of tanks to be filled, pressure transducer means coupled to the manifold for providing an electrical signal representing the pressure therein, temperature transducer means coupleable to at least one of the tanks for providing an electrical signal representing the temperature thereof, at least one evacuation means for evacuating the tanks, and at least one pumping/conducting means for pumping and conducting compressed gas to the tanks, the controller comprising: inputs which are adapted to be coupled to the pressure transducer means and the temperature transducer means and outputs which are adapted to be coupled to the evacuating means and to the pumping/conducting means, a computer routine executed by the controller automatically to operate the evacuating means to evacuate the tanks and to operate the pumping/conducting means to fill the tanks, the computer routine including (a) a first portion operative to cause the evacuating means to evacuate the tanks, and (b) a second portion operative to cause the pumping/conducting means to fill selected tanks with selected ones of the compressed gases, and a user interface to permit a user to receive information from and input information to the controller, the computer routine being field adjustable via the interface to enable user entry of the numbers of conduits, manifolds, evacuating means and pumping/conducting means and being automatically operable to control the system in accordance with the numbers entered.

2. The controller set forth in claim 1, wherein the evacuating means includes a venting portion and a portion to reduce the pressure in the tanks.

3. The controller set forth in claim 2, wherein the pressure-reducing portion includes a pump and an electronically controllable valve.

4. The controller set forth in claim 1, wherein each venting portion includes an electronically controllable valve.

5. The controller of claim 1, and further comprising a video screen touchable to select the number of conduits and the configuration of the evacuating means and the configuration of the pumping/conducting means.

6. A controller for use with a tank-filling system having a selected one of a number of configurations, the system including at least one conduit for coupling respectively to at least one source of compressed gas, at least one manifold for coupling to at least one group of tanks to be filled, at least one electronically controllable fill valve respectively coupled to the manifolds, at lease one electronically controllable vacuum valve coupled to the manifolds, pressure transducer means coupled to the manifolds for providing an electrical signal representing the pressures therein, temperature transducer means coupleable to at least one of the tanks for providing an electrical signal representing the temperatures thereof, at least one vacuum pump coupled to the vacuum valves, and at least one fill pump coupled between the fill valves and the conduits, the controller comprising: inputs which are adapted to be coupled to the pressure transducer means and the temperature transducer means and outputs which are adapted to be coupled to the vacuum pumps and to the fill pumps and to the valves, a computer routine executed by the controller automatically to operate the vacuum pumps and the vacuum valves to evacuate the tanks and to operate the fill pumps and the fill valves to fill the tanks, the computer routine including (a) a first portion operative to cause the vacuum pumps and the vacuum valves to evacuate the tanks to a selected point, and (b) a second portion operative to cause the fill pumps and the fill valves to fill selected tanks with selected ones of the compressed gases, and a user interface to permit a user to receive information from and input information to the controller, the computer routine being field adjustable via the interface to enable user entry of the numbers of fill pumps and vacuum pumps and conduits and manifolds and being automatically operable to control the system in accordance with the numbers entered.

7. The controller of claim 6, wherein the system further includes first and second electronically controllable venting valves coupled to the manifolds, the computer routine further comprising a third portion operative to cause the venting valves to vent gas from the tanks prior to causing the vacuum pumps and the vacuum valves to evacuate the tanks.

8. The controller of claim 6, and further comprising a video screen touchable to select the numbers of fill pumps and vacuum pumps and conduits.

9. A controller for use with a tank-filling system including a conduit for coupling to a source of compressed gas, a manifold for coupling to tanks to be filled, pressure transducer means coupled to the manifold for providing an electrical signal representing the pressure therein, temperature transducer means coupleable to at least one tank for providing an electrical signal representing the surface temperature thereof, means for evacuating the tanks, and means for pumping and conducting compressed gas to the tanks, the controller comprising: inputs which are adapted to be coupled to the pressure transducer means and the temperature transducer means and outputs which are adapted to be coupled to the evacuating means and the pumping/conducting means, a computer routine executed by the controller automatically to operate the evacuating means to evacuate the tanks and to operate the pumping/conducting means to fill the tanks, the computer routine including (a) a first portion operative to cause the evacuating means to evacuate the tanks, (b) a second portion operative to cause the pumping/conducting means to fill the tanks with the compressed gas, and (c) a third portion operative to cause the signal represented by the temperature sensed by the temperature transducer means to be changed by a predetermined factor, and a user interface to permit a user to receive information from and input information to the controller, the computer routine being field adjustable via the interface to enable user entry of the predetermined factor.

10. The controller of claim 9, and further comprising a video screen touchable to select the predetermined factor.

11. A controller for use with a tank-filling system having a selected one of a number of configurations, the system including at least one conduit for coupling respectively to at least one source of compressed gas, at least one manifold for coupling to at least one group of tanks to be filled, pressure transducer means coupled to the manifold for providing an electrical signal representing the pressure therein, temperature transducer means coupleable to at least one of the tanks for providing an electrical signal representing the temperature thereof, at least one evacuating means for evacuating the tanks, and at least one pumping/conducting means for pumping and conducting compressed gas to the tanks, the controller comprising: inputs which are adapted to be coupled to the pressure transducer means and the temperature transducer means and outputs which are adapted to be coupled to the evacuating means and to the pumping/conducting means, a computer routine executed by the controller automatically to operate the evacuating means to evacuate the tanks and to operate the pumping/conducting means to fill the tanks, the computer routine including (a) means for causing the evacuating means to evacuate the tanks, and (b) means for causing the pumping/conducting means to fill selected tanks with selected ones of the compressed gases, and a user interface to permit a user to receive information from and input information to the controller, the computer routine being field adjustable via the interface to enable user entry of the numbers of conduits, manifolds, evacuating means and pumping/conducting means and being automatically operable to control the system in accordance with the numbers entered.

12. The controller set forth in claim 11, wherein the evacuating means includes a venting portion and a portion to reduce the pressure in the tanks.

13. The controller set forth in claim 12, wherein the pressure-reducing portion includes a pump and an electronically controllable valve.

14. The controller set forth in claim 11, wherein each venting portion includes an electronically controllable valve.

15. The controller of claim 11, and further comprising a video screen touchable to select the number of conduits and the configuration of the evacuating means and the configuration of the pumping/conducting means.

16. A controller for use with a tank-filling system having a selected one of a number of configurations, the system including at least one conduit for coupling respectively to at least one source of compressed gas, at least one manifold for coupling to at least one group of tanks to be filled, at least one electronically controllable fill valve respectively coupled to the manifolds, at least one electronically controllable vacuum valve coupled to the manifolds, pressure transducer means coupled to the manifolds for providing an electrical signal representing the pressures therein, temperature transducer means coupleable to at least one of the tanks for providing an electrical signal representing the temperatures thereof, at least one vacuum pump coupled to the vacuum valves, and at least one fill pump coupled between the fill valves and the conduits, the controller comprising: inputs which are adapted to be coupled to the pressure transducer means and the temperature transducer means and outputs which are adapted to be coupled to the vacuum pumps and to the fill pumps and to the valves, a computer routine executed by the controller automatically to operate the vacuum pumps and the vacuum valves to evacuate the tanks and to operate the fill pumps and the fill valves to fill the tanks, the computer routine including (a) means for causing the vacuum pumps and the vacuum valves to evacuate the tanks to a selected point, and (b) means for causing the fill pumps and the fill valves to fill selected tanks with selected ones of the compressed gases, and a user interface to permit a user to receive information from and input information to the controller, the computer routine being field adjustable via the interface to enable user entry of the numbers of fill pumps and vacuum pumps and conduits and manifolds and being automatically operable to control the system in accordance with the numbers entered.

17. The controller of claim 16, wherein the system further includes first and second electronically controllable venting valves coupled to the manifolds, the computer routine further comprising means for causing the venting valves to vent gas from the tanks prior to causing the vacuum pumps and the vacuum valves to evacuate the tanks.

18. The controller of claim 16, and further comprising a video screen touchable to select the numbers of fill pumps and vacuum pumps and conduits.

19. A controller for use with a tank-filling system including a conduit for coupling to a source of compressed gas, a manifold for coupling to tanks to be filled, pressure transducer means coupled to the manifold for providing an electrical signal representing the pressure therein, temperature transducer means coupleable to at least one tank for providing an electrical signal representing the surface temperature thereof, means for evacuating the tanks, and means for pumping and conducting compressed gas to the tanks, the controller comprising: inputs which are adapted to be coupled to the pressure transducer means and the temperature transducer means and outputs which are adapted to be coupled to the evacuating means and the pumping/conducting means, a computer routine executed by the controller automatically to operate the evacuating means to evacuate the tanks and to operate the pumping/conducting means to fill the tanks, the computer routine including (a) means for causing the evacuating means to evacuate the tanks, (b) means for causing the pumping/conducting means to fill the tanks with the compressed gas, and (c) means for causing the signal represented by the temperature sensed by the temperature transducer means to be changed by a predetermined factor, and a user interface to permit a user to receive information from and input information to the controller, the computer routine being field adjustable via the interface to enable user entry of the predetermined factor.

20. The controller of claim 19, and further comprising a video screen touchable to select the predetermined factor.

* * * * *